US012781031B2

(12) United States Patent
Tanaka et al.

(10) Patent No.: US 12,781,031 B2
(45) Date of Patent: Nov. 3, 2026

(54) THERMOPLASTIC ELASTOMER COMPOSITION AND SHAPED ARTICLE THEREOF

(71) Applicant: MITSUI CHEMICALS, INC., Tokyo (JP)

(72) Inventors: Suguru Tanaka, Funabashi (JP); Yusuke Yoda, Kawasaki (JP)

(73) Assignee: MITSUI CHEMICALS, INC., Tokyo (JP)

( * ) Notice: Subject to any disclaimer, the term of this patent is extended or adjusted under 35 U.S.C. 154(b) by 805 days.

(21) Appl. No.: 17/797,024

(22) PCT Filed: Mar. 22, 2021

(86) PCT No.: PCT/JP2021/011756

§ 371 (c)(1),
(2) Date: Aug. 2, 2022

(87) PCT Pub. No.: WO2021/193554

PCT Pub. Date: Sep. 30, 2021

(65) Prior Publication Data

US 2023/0076229 A1 Mar. 9, 2023

(30) Foreign Application Priority Data

Mar. 27, 2020 (JP) ................................. 2020-058365

(51) Int. Cl.
*C08L 23/0807* (2025.01)

(52) U.S. Cl.
CPC ....... *C08L 23/0815* (2013.01); *C08L 2205/02* (2013.01); *C08L 2205/035* (2013.01)

(58) Field of Classification Search
CPC ...... C08L 23/0815; C08L 23/08; C08L 23/12; C08L 83/04; C08L 91/01; C08K 5/20; C08K 5/00525; C08K 3/04
See application file for complete search history.

(56) References Cited

U.S. PATENT DOCUMENTS

| | | | |
|---|---|---|---|
| 6,677,397 | B1 | 1/2004 | Baranowski et al. |
| 6,706,385 | B1 | 3/2004 | Karaiwa |
| 10,266,683 | B2 | 4/2019 | Kerstetter et al. |
| 2004/0161560 | A1 | 8/2004 | Baranowski et al. |
| 2006/0047048 | A1 | 3/2006 | Sugiura et al. |
| 2015/0056457 | A1 | 2/2015 | Kerstetter et al. |

FOREIGN PATENT DOCUMENTS

| | | | |
|---|---|---|---|
| CN | 1694921 | A | 11/2005 |
| JP | 10-067893 | A | 3/1998 |
| JP | H11-342750 | A | 12/1999 |
| JP | 2000-026668 | A | 1/2000 |
| JP | 2000-095900 | A | 4/2000 |
| JP | 2000-119447 | A | 4/2000 |
| JP | 2001-001450 | A | 1/2001 |
| JP | 2002-338778 | A | 11/2002 |
| JP | 2003-003023 | A | 1/2003 |
| JP | 2003-183465 | A | 7/2003 |
| JP | 2004-505864 | A | 2/2004 |
| JP | 2004-161946 | A | 6/2004 |
| JP | 2015-521223 | A | 7/2015 |

OTHER PUBLICATIONS https://www.sciencedirect.com/science/article/pii/0032386163900259 Farrow, G. , Crystallinity, Crystallite Size and Melting Point of Polypropylene (Year: 1963).*

Office Action issued in corresponding Chinese Patent Application No. 202180022612.9 dated May 7, 2024.

Plastic Rubber Coating and Painting Technology (1st Edition), Liu Ed., p. 179, Chemical Industry Press, Jan. 31, 2001.

"China Plastics Industry Yearbook (1st edition)", edited by the China Plastics Processing Industry Association, p. 342, China Light Industry Press, Dec. 31, 2015.

"Plastic Materials (1st Edition)", edited by Kong Ping et al., pp. 277-278, Guangdong Higher Education Press, Jul. 31, 2017.

Office Action issued in corresponding Chinese Patent Application No. 202180022612.9 dated Jul. 25, 2024 (12 pages).

* cited by examiner

*Primary Examiner* — Catherine S Branch
*Assistant Examiner* — Olga Lucia Donahue
(74) *Attorney, Agent, or Firm* — Foley & Lardner LLP

(57) ABSTRACT

One embodiment of the present invention relates to a thermoplastic elastomer composition or a shaped article thereof. The thermoplastic elastomer composition includes 100 parts by mass of an ethylene/α-olefin/non-conjugated polyene copolymer (A) including constituent units derived from ethylene, a C3-C20 α-olefin and a non-conjugated polyene; 1 to 100 parts by mass of a crystalline polyolefin (B); 0.1 to 20 parts by mass of a polyorganosiloxane (C) having a viscosity at 25° C. (measured by a method in accordance with ASTM D 445-46T) of 100,000 cSt or less; and 0.1 to 3 parts by mass of a higher fatty acid amide (D).

8 Claims, No Drawings

THERMOPLASTIC ELASTOMER COMPOSITION AND SHAPED ARTICLE THEREOF

CROSS-REFERENCE TO RELATED APPLICATIONS

The present application claims priority under 37 U.S.C. § 371 to International Patent Application No. PCT/JP2021/011756, filed Mar. 22, 2021, which claims priority to and the benefit of Japanese Patent Application No. 2020-058365, filed on Mar. 27, 2020. The contents of these applications are hereby incorporated by reference in their entireties.

TECHNICAL FIELD

One embodiment of the present invention relates to a thermoplastic elastomer composition or a shaped article thereof.

BACKGROUND ART

Various materials are conventionally used for parts or portions requiring rubber elasticity, for example, parts of automobiles and other vehicles, industrial machine parts, electric/electronic parts, and building materials. Examples of such vehicle parts include weatherstripping and glass run channels. A glass run channel is a guide member provided between a window glass and a window frame, and holds the window glass and provides a tight seal (against the passage of liquid) between the window glass and the window frame while ensuring that the window glass can be easily raised or lowered, namely, easily opened or closed.

Thermoplastic elastomers capable of giving shaped articles with excellent slidability and wear resistance have been suggested as materials that may be used for glass run channels (for example, Patent Literatures 1 and 2).

CITATION LIST

Patent Literature

Patent Literature 1: JP-A-2000-95900
Patent Literature 2: JP-A-2000-26668

SUMMARY OF INVENTION

Technical Problem

In recent years, the number of hot days is increasing due to climate change, and the demands are increasing for vehicles such as automobiles in hot regions. These and other factors have led to a demand for parts of automobiles and other vehicles that offer slidability even at high temperatures.

Unfortunately, the conventional shaped articles described in literature such as Patent Literatures 1 and 2 have room for improvement in terms of slidability at high temperatures (for example, 80° C. or above).

One embodiment of the present invention provides a thermoplastic elastomer composition capable of giving a shaped article that offers excellent slidability, in particular, excellent slidability at high temperatures, and is unlikely to suffer bleed-out or become sticky even at high temperatures, as well as being comparable to the conventional products in terms of mechanical properties such as hardness, tensile characteristics and compression set.

Solution to Problem

The present inventors carried out further studies and have found that the problems discussed above can be solved according to the configuration examples below. Some configuration examples of the present invention are as follows.

In the present specification, the numerical ranges written as "A to B" indicate A or more and B or less.

[1] A thermoplastic elastomer composition comprising:

100 parts by mass of an ethylene/α-olefin/non-conjugated polyene copolymer (A) comprising constituent units derived from ethylene, a C3-C20 α-olefin and a non-conjugated polyene;

1 to 100 parts by mass of a crystalline polyolefin (B);

0.1 to 20 parts by mass of a polyorganosiloxane (C) having a viscosity at 25° C. (measured by a method in accordance with ASTM D 445-46T) of 100,000 cSt or less; and 0.1 to 3 parts by mass of a higher fatty acid amide (D).

[2] The thermoplastic elastomer composition described in [1], wherein the crystalline polyolefin (B) has a melt flow rate (measured at 230° C. under 2.16 kg load by a method in accordance with ASTM D 1238-65T) of 0.01 to 100 g/10 min, and has a melting point (measured by a method in accordance with JIS K 7121) of 100° C. or above.

[3] The thermoplastic elastomer composition described in [1] or [2], further comprising a softener (E).

[4] The thermoplastic elastomer composition described in any of [1] to [3], wherein the crystalline polyolefin (B) comprises a crystalline olefin copolymer (B1) and a crystalline olefin homopolymer (B2).

[5] The thermoplastic elastomer composition described in any of [1] to [4], which is a thermoplastic elastomer composition obtained by dynamic heat treatment in the presence of a crosslinking agent.

[6] A shaped article comprising the thermoplastic elastomer composition described in any of [1] to [5].

[7] A vehicle part comprising the shaped article described in [6].

[8] The vehicle part described in [7], which is a glass run channel member.

Advantageous Effects of Invention

According to one embodiment of the present invention, a shaped article can be produced that offers excellent slidability, in particular, excellent slidability at high temperatures, and is unlikely to suffer bleed-out or become sticky even at high temperatures, as well as being comparable to the conventional products in terms of mechanical properties such as hardness, tensile characteristics and compression set.

DESCRIPTION OF EMBODIMENTS

Hereinbelow, an embodiment of the present invention will be described in detail. However, it should be construed that the scope of the present invention is not limited to the configurations of the following embodiment.

<<Thermoplastic Elastomer Compositions>>

A thermoplastic elastomer composition according to an embodiment of the present invention (hereinafter, also written as the "present composition") includes 100 parts by mass of an ethylene/α-olefin/non-conjugated polyene copolymer (A) comprising constituent units derived from ethylene, a C3-C20 α-olefin and a non-conjugated polyene, 1 to 100 parts by mass of a crystalline polyolefin (B), 0.1 to 20 parts by mass of a polyorganosiloxane (C) having a viscosity at 25° C. (measured by a method in accordance with ASTM D 445-46T) of 100,000 cSt or less, and 0.1 to 3 parts by mass of a higher fatty acid amide (D).

<Ethylene/α-Olefin/Non-Conjugated Polyene Copolymers (A)>

The ethylene/α-olefin/non-conjugated polyene copolymer (A) (hereinafter, also written as the "component (A)"; the same applies to other components) is not particularly limited as long as comprising constituent units derived from ethylene, constituent units derived from a C3-C20 α-olefin and constituent units derived from a non-conjugated polyene, and may be synthesized by, for example, copolymerizing ethylene, a C3-C20 α-olefin and a non-conjugated polyene in accordance with a conventionally known method.

The component (A) contained in the present composition may be a single copolymer, or two or more kinds of copolymers.

Preferably, the component (A) in the present composition is partially crosslinked or completely crosslinked with a crosslinking agent.

Based on the total of the content of the ethylene-derived constituent units (hereinafter, also written as the "ethylene content") and the content of the C3-C20 α-olefin-derived constituent units (hereinafter, also written as the "α-olefin content") in the component (A) taken as 100 mol %, the ethylene content is preferably 50 mol % or more, and more preferably 60 mol % or more, and is more preferably 90 mol % or less, and still more preferably 85 mol % or less for reasons such as because shaped articles having excellent mechanical strength and flexibility can be easily obtained.

The contents of the respective constituent units forming the component (A) may be determined by $^{13}$C-NMR measurement.

Specific examples of the C3-C20 α-olefins include propylene, 1-butene, 1-pentene, 1-hexene, 4-methyl-1-pentene, 1-heptene, 1-octene, 1-nonene, 1-decene, 1-undecene, 1-dodecene, 1-tridecene, 1-tetradecene, 1-hexadecene, 1-octadecene and 1-eicosene. The α-olefins may be used singly, or two or more may be used in combination.

Among the α-olefins, propylene and 1-butene are preferable, and propylene is more preferable.

Based on the total of the ethylene content and the α-olefin content in the component (A) taken as 100 mol %, the α-olefin content is preferably 50 mol % or less, and more preferably 40 mol % or less, and is more preferably 10 mol % or more, and still more preferably 15 mol % or more for reasons such as because shaped articles having excellent mechanical strength and flexibility can be easily obtained.

Examples of the non-conjugated polyenes include chain non-conjugated dienes, cyclic non-conjugated dienes and trienes. The non-conjugated polyenes may be used singly, or two or more may be used in combination.

Examples of the chain non-conjugated dienes include 1,4-hexadiene, 1,5-hexadiene, 1,6-hexadiene, 3-methyl-1,4-hexadiene, 4-methyl-1,4-hexadiene, 5-methyl-1,4-hexadiene, 4,5-dimethyl-1,4-hexadiene, 7-methyl-1,6-octadiene, 3,7-dimethyl-1,6-octadiene and 5,7-dimethyl-1,7-octadiene.

Examples of the cyclic non-conjugated dienes include tetrahydroindene, methyltetrahydroindene, 5-ethylidene norbornene, 5-methylene-2-norbornene, 5-propenyl norbornene, 5-isopropylidene-2-norbornene, 5-vinylidene-2-norbornene, 6-chloromethyl-5-isopropenyl-2-norbornene, 5-vinyl-2-norbornene, 5-isopropenyl-2-norbornene, 5-isobutenyl-2-norbornene, 5-cyclohexylidene-2-norbornene, cyclopentadiene, dicyclopentadiene, cyclooctadiene and norbornadiene.

Examples of the trienes include 2,3-diisopropylidene-5-norbornene, 2-ethylidene-3-isopropylidene-5-norbornene, 2-propenyl-2,2-norbornadiene, 4-ethylidene-1,7-undecadiene and 4-ethylidene-8-methyl-1,7-nonadiene.

Among the non-conjugated polyenes, 5-ethylidene-2-norbornene, 5-vinyl-2-norbornene, cyclopentadiene and 4-ethylidene-8-methyl-1,7-nonadiene are preferable.

The content of the non-conjugated polyene-derived constituent units in the component (A) is preferably 0.5 mol % or more, and more preferably 1.0 mol % or more, and is preferably 3.0 mol % or less, and more preferably 2.0 mol % or less.

For reasons such as because the component (A) can easily form a uniform mixture together with other components, the Mooney viscosity [$ML_{(1+4)}$ (100° C.)] of the component is preferably 10 or more, and more preferably 30 or more, and is preferably 250 or less, and more preferably 150 or less.

When the Mooney viscosity of the component (A) itself is not within the above range, the component may be treated as required by a conventionally known method, for example, may be extended with an oil extender such as a softener (E) described later. The amount of the oil extender used for the oil extension is preferably such that the Mooney viscosity of the extended component falls in the above range, and is, for example, 0 to 150 parts by mass with respect to 100 parts by mass of the component (A).

The above Mooney viscosity is a value measured at 100° C. in accordance with JIS K 6300.

The content of the component (A) in the present composition is preferably 20 mass % or more, and more preferably 30 mass % or more, and is preferably 55 mass % or less, and more preferably 45 mass % or less for reasons such as because shaped articles that exhibit excellent mechanical properties and offer high slidability in a well-balanced manner can be easily obtained.

<Crystalline Polyolefins (B)>

The component (B) is a polymer other than the component (A), and may be an olefin homopolymer or a copolymer of two or more kinds of olefins. The olefin is preferably an α-olefin.

The term crystalline means that the polymer shows a melting point (Tm) in differential scanning calorimetry (DSC).

The component (B) contained in the present composition may be a single polymer, or two or more kinds of polymers.

For example, the component (B) may be an ethylene homopolymer (the production method may be a low-pressure method or a high-pressure method); a copolymer of ethylene and 10 mol % or less of another α-olefin or a vinyl monomer such as vinyl acetate or ethyl acrylate; a propylene homopolymer; a random copolymer of propylene and 10 mol % or less of another α-olefin; a block copolymer of propylene and 30 mol % or less of another α-olefin; a 1-butene homopolymer; a random copolymer of 1-butene and 10 mol % or less of another α-olefin; a 4-methyl-1-pentene homopolymer; or a random copolymer of 4-methyl-1-pentene and 20 mol % or less of another α-olefin.

The α-olefin is preferably a C2-C20 α-olefin, with specific examples including ethylene, propylene, 1-butene, 1-pentene, 1-hexene, 4-methyl-1-pentene, 1-heptene, 1-octene, 1-nonene, 1-decene, 1-undecene, 1-dodecene, 1-tridecene, 1-tetradecene, 1-hexadecene, 1-octadecene and 1-eicosene.

The component (B) preferably comprises a crystalline olefin copolymer (B1). The copolymer (B1) is preferably a copolymer of propylene and a comonomer other than propylene. The structure of the copolymer (B1) is not particularly limited, and may be a random type, a block type or a graft type, with a random type being more preferable.

In the copolymer (B1), the content of the constituent units derived from the comonomer is preferably 50 mass % or less, and more preferably 40 mass % or less, and is more preferably 1 mass % or more.

The comonomer other than propylene in the copolymer (B1) is preferably an α-olefin, and more preferably an α-olefin having 2 or 4 to 20 carbon atoms. Specific examples include ethylene, 1-butene, 1-pentene, 1-hexene, 4-methyl-1-pentene, 1-heptene, 1-octene, 1-nonene, 1-decene, 1-undecene, 1-dodecene, 1-tridecene, 1-tetradecene, 1-hexadecene, 1-octadecene and 1-eicosene, with ethylene being preferable.

When the component (B) comprises the copolymer (B1), it is preferable, from points of view such as heat resistance and shaping properties, that the component (B) comprise a crystalline olefin homopolymer (B2). The homopolymer (B2) is preferably a propylene homopolymer. The propylene homopolymer may be an isotactic polypropylene or a syndiotactic polypropylene.

The component (B) may be synthesized by a conventionally known method or may be purchased from the market.

From points of view such as heat resistance, the melting point (Tm) of the component (B) measured by a measurement method in accordance with JIS K 7121 is preferably 100° C. or above, and more preferably 130° C. or above, and is more preferably 170° C. or below.

For reasons such as because the present composition can easily attain excellent shaping properties, the melt flow rate (MFR; measured at 230° C. under 2.16 kg load by a method in accordance with ASTM D 1238-65T) of the component (B) is preferably 0.01 g/10 min or more, more preferably 1 g/10 min or more, still more preferably 10 g/10 min or more, and particularly preferably 30 g/10 min or more, and is preferably 100 g/10 min or less, and particularly preferably 70 g/10 min or less.

The MFR of the copolymer (B1) measured in the similar manner is preferably 1 g/10 min or more, and more preferably 30 g/10 min or more, and is preferably 100 g/10 min or less, and more preferably 70 g/10 min or less.

The MFR of the homopolymer (B2) measured in the similar manner is preferably 0.01 g/10 min or more, and more preferably 10 g/10 min or more, and is preferably 50 g/10 min or less, and more preferably 30 g/10 min or less.

By using the two types of components (B) having an MFR in the above range, shaping properties and mechanical strength can be easily satisfied at the same time.

For reasons such as because shaped articles that exhibit excellent mechanical properties and offer high slidability in a well-balanced manner can be easily obtained, the content of the component (B) with respect to 100 parts by mass of the component (A) is 1 to 100 parts by mass, and is preferably 20 parts by mass or more, and more preferably 30 parts by mass or more, and is preferably 95 parts by mass or less, and more preferably 90 parts by mass or less.

For the same reasons, the content of the copolymer (B1) with respect to 100 parts by mass of the component (A) is preferably 20 parts by mass or more, and more preferably 30 parts by mass or more, and is preferably 95 parts by mass or less, and more preferably 90 parts by mass or less.

When the copolymer (B1) is used as the component (B), the content of the copolymer (B1) based on 100 mass % of the component (B) is preferably 30 mass % or more, and more preferably 40 mass % or more, and is preferably 100 mass % or less, from points of view such as weldability of a glass run channel with respect to a substrate.

When the copolymer (B1) and the homopolymer (B2) are used as the component (B), the content of the homopolymer (B2) with respect to 100 parts by mass of the copolymer (B1) is preferably 30 parts by mass or more, and more preferably 50 parts by mass or more, and is preferably 80 parts by mass or less, and more preferably 70 parts by mass or less, for reasons such as because the occurrence of shaping defects (such as sink marks) during injection molding tends to be suppressed.

<Polyorganosiloxanes (C)>

Examples of the components (C) include dimethylpolysiloxane, methylphenylpolysiloxane, fluoropolysiloxane, tetramethyltetraphenylpolysiloxane and methylhydrogenpolysiloxane, with dimethylpolysiloxane being preferable.

The component (C) may be modified polysiloxane obtained by the above siloxanes given as examples being modified, for example, epoxy-modified, alkyl-modified, amino-modified, carboxyl-modified, alcohol-modified, fluorine-modified, alkylaralkylpolyether-modified or epoxy-polyether-modified. It is, however, preferable that the component (C) be not such a modified polysiloxane.

The component (C) contained in the present composition may be a single polyorganosiloxane, or two or more kinds of polyorganosiloxanes.

For purposes such as to enhance the dispersibility in the present composition, the component (C) may be used as a masterbatch by being mixed together beforehand with a component such as the component (B).

For reasons such as because shaped articles can be easily obtained that exhibit excellent mechanical properties and offer high slidability in a well-balanced manner and are unlikely to suffer bleeding out of the component (C), the viscosity of the component (C) at 25° C. (measured in accordance with ASTM D 445-46T) is 100,000 cSt ($mm^2/s$) or less, and is preferably 80,000 cSt or less, and more preferably 70,000 cSt or less, and is preferably 13,000 cSt or more, more preferably 15,000 cSt or more, and still more preferably 20,000 cSt or more.

For reasons such as because shaped articles can be easily obtained that exhibit excellent mechanical properties and offer high slidability in a well-balanced manner and are unlikely to suffer bleeding out of the component (C), the content of the component (C) with respect to 100 parts by mass of the component (A) is 0.1 to 20 parts by mass, and is preferably 1.5 parts by mass or more, more preferably 2 parts by mass or more, and still more preferably 3 parts by mass or more, and is preferably 10 parts by mass or less, and more preferably 5 parts by mass or less.

<Higher Fatty Acid Amides (D)>

The component (D) is not particularly limited, and a conventionally known compound may be used.

Examples of the higher fatty acids include fatty acids having 10 or more carbon atoms, preferably 12 or more carbon atoms, and preferably 24 or less carbon atoms (with the proviso that the number of carbon atoms is the number of carbon atoms in the higher fatty acid and is not the number of carbon atoms in the component (D); for example, the number of carbon atoms in a bis fatty acid amide described below is approximately twice the above number of carbon atoms).

The component (D) contained in the present composition may be a single kind of a compound, or two or more kinds of compounds.

Examples of the components (D) include saturated fatty acid amides, unsaturated fatty acid amides and bis fatty acid amides.

Examples of the saturated fatty acid amides include lauramide, palmitamide, stearamide and behenamide.

Examples of the unsaturated fatty acid amides include erucamide, oleamide, brassidamide and elaidamide.

Examples of the bis fatty acid amides include methylenebisstearamide, methylenebisoleamide, ethylenebisstearamide and ethylenebisoleamide.

Among those described above, erucamide, oleamide and ethylenebisoleamide are preferable.

The content of the component (D) with respect to 100 parts by mass of the component (A) is 0.1 to 3 parts by mass, and is preferably 0.2 parts by mass or more, and more preferably 0.3 parts by mass or more, and is preferably 2.0 parts by mass or less, and more preferably 0.7 parts by mass or less.

When the content of the component (D) is in the above range, shaped articles that exhibit excellent mechanical properties and offer high slidability in a well-balanced manner can be easily obtained. If, on the other hand, the content of the component (D) is higher than the above upper limit, the component (D) tends to bleed out and stickiness problems are easily encountered.

<Further Additives>

The present composition may include further additives in addition to the components (A) to (D) as required without impairing the object of the present invention. Examples of the further additives include softeners (E), heat stabilizers, antistatic agents, weather stabilizers, antiaging agents, fillers, flame retardants, colorants, crosslinking agents and crosslinking aids.

The further additives belonging to the same type may be used singly, or two or more may be used in combination.

[Softeners (E)]

Examples of the components (E) include compounds capable of softening the component (A), with specific examples including mineral oil hydrocarbons such as paraffinic compounds, naphthenic compounds and aromatic compounds, low-molecular hydrocarbons such as polybutene compounds and polybutadiene compounds, and glycerin. Among those described above, mineral oil hydrocarbons are preferable, and paraffinic compounds are more preferable.

For example, the above compounds may be in the form of oil or wax.

For example, the component (E) may be used by being mixed together beforehand with the component (A) (oil extension) as described hereinabove, may be used when preparing the present composition, or may be post-added when the components for the present composition are dynamically heat treated.

When the component (E) is used, the amount thereof with respect to 100 parts by mass of the component (A) is preferably 1 part by mass or more, and more preferably 30 parts by mass or more, and is preferably 100 parts by mass or less, and more preferably 70 parts by mass or less.

[Crosslinking Agents]

A crosslinking agent is preferably used when the component (A) is to be partially or completely crosslinked, particularly when the components added to the present composition are dynamically heat treated.

The crosslinking agent is not particularly limited and may be a conventionally known crosslinking agent. Examples include organic peroxides, phenolic crosslinking agents, sulfur, sulfur compounds, oxime compounds, bismaleimide compounds, epoxy compounds, silane compounds, amino resins, polyol crosslinking agents, polyamines, triazine compounds and metal soaps. Among those described above, organic peroxides and phenolic crosslinking agents are preferable.

When the crosslinking agent is used, the amount thereof with respect to 100 parts by mass of the component (A) is preferably 0.1 part by mass or more, and more preferably 0.5 parts by mass or more, and is preferably 5 parts by mass or less, and more preferably 3 parts by mass or less.

The crosslinking agent is preferably used in combination with a crosslinking aid for purposes such as to ensure that the crosslinking reaction will be uniform.

The crosslinking aid is not particularly limited and may be a conventionally known crosslinking aid. Examples include sulfur, sulfur compounds, oxime compounds and polyfunctional monomers (for example, poly(meth)acrylates and polyvinyl monomers). Among those described above, divinylbenzene is preferable.

[Fillers]

Any of inorganic fillers and organic fillers may be used as fillers. Inorganic fillers are particularly preferably used.

Examples of the inorganic fillers include glass fibers, carbon fibers, silica fibers, asbestos, fibers of metals (such as stainless steel, aluminum, titanium and copper), carbon blacks, graphites, silicas, Shirasu balloons, glass beads, silicate salts (such as calcium silicate, talc, clay, kaolin and mica), diatomaceous earth, metal oxides (such as iron oxide, titanium oxide and alumina), metal carbonate salts (such as calcium carbonate, barium carbonate and basic magnesium carbonate), metal sulfate salts (such as barium sulfate, aluminum sulfate, calcium sulfate, and basic magnesium sulfate whiskers), metal sulfides (such as molybdenum disulfide), powders of various metals (such as magnesium, silicon, aluminum, titanium and copper), glass flakes, glass balls, calcium titanate whiskers and aluminum borate whiskers.

When the present composition contains the filler, the content of the filler in the present composition is not limited as long as the advantageous effects of the present invention are obtained, but is preferably 0.1 mass % or more, and more preferably 1 mass % or more, and is preferably 30 mass % or less, and more preferably 20 mass % or less.

<Methods for Production of the Present Compositions>

The present composition may be produced by mixing and kneading the components (A) to (D) and, if necessary, the further additives described hereinabove.

The mixing and kneading is preferably performed with a conventionally known mixing/kneading machine such as a Banbury mixer, a mixing roll, a Henschel mixer, a kneader, or a single-screw or twin-screw extruder. The order in which the components are added to the mixing and kneading process is not particularly limited.

The present composition is preferably produced in such a manner that the components (A) to (D) and, if necessary, the further additives are dynamically heat treated, in particular, dynamically crosslinked. Specifically, for example, the dynamic heat treatment (dynamic crosslinking) may be performed by mixing and kneading the components (A) to (D) and, if necessary, the further additives in a mixing/kneading machine while performing heating. It is preferable to apply a shear force during the mixing and kneading process. In this case, at least the crosslinking agent is preferably used as the further additive.

The composition resulting from the dynamic heat treatment includes a component formed by crosslinking of at least part of the component (A). Here, the phrase "crosslinking of at least part" means that the gel content is, for example, 5 mass % or more, preferably 10 mass % or more, and is, for example, 98 mass % or less, preferably 95 mass % or less.

The dynamic heat treatment is preferably performed in a hermetic device, and is preferably carried out in an atmosphere of an inert gas such as nitrogen or carbon dioxide.

The heat treatment temperature in the dynamic heat treatment is usually 150° C. or above, and preferably 170° C. or above, and is usually 280° C. or below, and preferably 240° C. or below. The amount of heat treatment time is usually 1 minute or more, and preferably 3 minutes or more, and is usually 20 minutes or less, and preferably 10 minutes or less.

The shear force applied during the mixing and kneading process may be such that the maximum shear rate is, for example, 10 $sec^{-1}$ or more, preferably 100 $sec^{-1}$ or more, more preferably 1,000 $sec^{-1}$ or more, and still more preferably 2,000 $sec^{-1}$ or more, and is, for example 100,000 $sec^{-1}$ or less, preferably 50,000 $sec^{-1}$ or less, more preferably 10,000 $sec^{-1}$ or less, and still more preferably 7,000 $sec^{-1}$ or less.

<<Shaped Articles>>

A shaped article according to one embodiment of the present invention is not particularly limited as long as the shaped article includes the present composition. The shaped article may be formed by any known shaping method in accordance with the use application. Examples of the shaping methods include, for example, press molding, injection molding, extrusion, blow molding and compression molding.

The shaped article according to one embodiment of the present invention is preferably used not as a skin member but by being joined with other shaped article.

The coefficient of static friction of the shaped article measured at room temperature in accordance with JIS K 7125 is preferably 0.5 or less, more preferably 0.4 or less, and still more preferably 0.3 or less. The lower limit is not particularly limited, but is, for example, 0.01 or more.

The coefficient of dynamic friction of the shaped article measured at room temperature in accordance with JIS K 7125 is preferably 0.5 or less, more preferably 0.4 or less, and still more preferably 0.3 or less. The lower limit is not particularly limited, but is, for example, 0.01 or more.

The coefficient of static friction of the shaped article measured at 80° C. in accordance with JIS K 7125 is preferably 0.8 or less, and more preferably 0.6 or less. The lower limit is not particularly limited, but is, for example, 0.01 or more.

The coefficient of dynamic friction of the shaped article measured at 80° C. in accordance with JIS K 7125 is preferably 0.8 or less, and more preferably 0.6 or less. The lower limit is not particularly limited, but is, for example, 0.01 or more.

When the coefficient of static friction or the coefficient of dynamic friction at 80° C. is in the above range, it can be said that the shaped article offers excellent slidability at high temperatures.

Examples of the use applications of the shaped articles include a wide range of fields including vehicle parts such as automobile parts, civil engineering/building material parts, sporting goods, industrial parts, home appliance parts, medical equipment parts and miscellaneous goods. Examples of the vehicle parts include glass run channel members, weatherstripping members, window molding members and side molding members. Among those described above, glass run channel members are preferable for reasons such as because the advantageous effects of the present invention are produced more prominently.

EXAMPLES

The present invention will be described in greater detail based on Examples hereinbelow. However, it should be construed that the scope of the present invention is not limited to such Examples.

<Raw Materials>

The raw materials used in Examples and Comparative Examples below are as follows.

"Copolymer (A-1)": Oil-extended ethylene/propylene/5-ethylidene-2-norbornene copolymer (ethylene content: 64 mass %, diene content: 5.4 mass %, Mooney viscosity [$ML_{1+4}$ (100° C.)]: 69, amount of oil extender per 100 parts by mass of rubber component: 40 PHR).

A paraffinic process oil ("PW-100" manufactured by Idemitsu Kosan Co., Ltd., a softener (E-1) described later) was used for the oil extension of the copolymer (A-1).

"PP-1": Crystalline random polypropylene, "Prime Polypro J229E" manufactured by Prime Polymer Co., Ltd. (MFR (230° C., 2.16 kg load): 50 g/10 min, Tm: 148° C.)

"PP-2": Crystalline homopolypropylene, "Prime Polypro J-2000GP" manufactured by Prime Polymer Co., Ltd. (MFR (230° C., 2.16 kg load): 20 g/10 min, Tm: 165° C.)

"Silicone masterbatch (C-1)": A mixture of 40 parts by mass of "KF-96H-60,000 CS" (polyorganosiloxane, viscosity (25° C.): 60,000 cSt) manufactured by Shin-Etsu Chemical Co., Ltd., and 60 parts by mass of "PM970A" manufactured by SunAllomer Ltd.).

"Silicone masterbatch (C'-2)": "BY27-001" (trade name) manufactured by Toray Dow Corning Co., Ltd. (a mixture of 50 parts by mass of polyorganosiloxane and 50 parts by mass of polypropylene, viscosity of polyorganosiloxane (25° C.) 500,000 cSt).

"Silicone oil (C-3)": "KF-96-100CS" (trade name) manufactured by Shin-Etsu Chemical Co., Ltd., viscosity of polyorganosiloxane (25° C.): 100 cSt.

"Higher fatty acid amide (D-1)": Oleamide ("ARMOSLIP CP" manufactured by Lion Specialty Chemicals Co., Ltd.).

"Softener (E-1)": Paraffinic process oil ("PW-100" manufactured by Idemitsu Kosan Co., Ltd.).

"Crosslinking agent": "PERHEXA 25B" manufactured by NOF CORPORATION.

"Crosslinking aid": Divinylbenzene.

"Carbon black": "PEONY BLACK F32387MM" manufactured by DIC CORPORATION.

<Mass Fractions of Constituent Units>

The mass fractions (mass %) of the constituent units constituting the ethylene/propylene/5-ethylidene-2-norbornene copolymer in the copolymer (A-1) were determined from values measured by $^{13}$C-NMR. Specifically, the mass fractions were calculated from a $^{13}$C-NMR spectrum of the copolymer (A-1) measured with nuclear magnetic resonance device ECX400P (manufactured by JEOL Ltd.) under conditions where measurement temperature: 120° C., measurement solvent: orthodichlorobenzene/deuterated benzene=4/1 (by volume), and number of scans: 8000.

<Mooney Viscosity>

The Mooney viscosity of the copolymer (A-1) was measured at 100° C. in accordance with JIS K 6300.

<Melting Point Tm>

The melting points Tm of the PP-1 and the PP-2 were measured with a differential scanning calorimeter (DSC) in accordance with JIS K 7121. Specifically, pellets of the PP-1 or the PP-2 were heated at 230° C. for 10 minutes, then cooled to 30° C. at a rate of 10° C./min, held at the temperature for 1 minute, and heated at a rate of 10° C./min. The temperature corresponding to the maximum amount of absorbed heat in the DSC curve recorded during the above process was adopted as the melting point Tm.

<Melt Flow Rate (MFR)>

The MFRs of the PP-1 and the PP-2 were measured at 230° C. under 2.16 kg load in accordance with ASTM D 1238-65T.

<Viscosities of Polyorganosiloxanes>

The viscosities of the polyorganosiloxanes in the silicone masterbatches (C-1) and (C'-2) and of the silicone oil (C-3) were measured at 25° C. by a method in accordance with ASTM D 445-46T.

Incidentally, the viscosities of the polyorganosiloxanes in the silicone masterbatches (C-1) and (C'-2) may be measured with respect to the polyorganosiloxane obtained by separating the polyorganosiloxane from the polypropylene in the silicone masterbatch by a known treatment such as one described in WO 2018/180362.

Example 1

In a Henschel mixer, the copolymer (A-1), the PP-1, the silicone masterbatch (C-1), the higher fatty acid amide (D-1), the softener (E-1) and further additives were sufficiently mixed together in the amounts described in the section of raw materials in Table 1.

The numerical values in the section of raw materials in Table 1 indicate parts by mass.

The numerical values in the section of the copolymer (A-1) in Table 1 indicate the amounts added of the rubber component alone excluding the amount of the oil extender.

The numerical values in the sections of the silicone masterbatch (C-1) and the silicone masterbatch (C'-2) in Table 1 indicate the amounts added of the respective masterbatches. Incidentally, "PM970A" and the polypropylene contained in (C-1) and (C'-2) are both crystalline polyolefins (B).

The numerical values (contents [parts by mass]) in the section of the softener (E-1) in Table 1 are the total amounts of the softener (E-1) contained in the copolymer (A-1) that was used, the softener (E-1) used when the crosslinking agent was mixed, and the softener (E-1) used in the pellet preparation described below.

After the materials were sufficiently mixed in the Henschel mixer, the resultant mixture and 25 parts by mass of the softener (E-1) were injected into a cylinder of an extruder and pelletized (model: KTX-46MX, manufactured by KOBE STEEL, LTD., L/D=43, cylinder C1 temperature: 110° C., cylinder C2 temperature: 120° C., cylinder C3 and C4 temperatures: 140° C., cylinder C5 temperature: 150° C., cylinder C6 temperature: 160° C., cylinder C7 and C8 temperatures: 180° C., cylinder C9 temperature: 200° C., cylinder C10 to C14 temperatures: 230° C., die temperature: 200° C., screw rotational speed: 400 rpm, throughput: 60 kg/h). Pellets of a thermoplastic elastomer composition were thus obtained.

Example 2 and Comparative Examples 1 to 6

Pellets of thermoplastic elastomer compositions were obtained in the same manner as in Example 1, except that the types and the amounts of the raw materials used were changed as described in Table 1, and that the amount of the softener (E-1) used in the pellet preparation was controlled so that the total amount of the softener (E-1) would be as described in Table 1.

<Fabrication of Pressed Sheets>

The pellets of the thermoplastic elastomer composition obtained in Example or Comparative Example were pressed with a hot press machine (press temperature: 190° C., cooling temperature: 20° C., preheating time: 6 minutes, melting time under pressure: 4 minutes). By the pressing, each of the compositions was formed into a flat pressed sheet having a length of 12 cm, a width of 14.7 cm and a thickness of 2 mm.

<Fabrication of Injection Molded Articles>

The pellets of the thermoplastic elastomer composition obtained in Example or Comparative Example were injection molded under the following conditions to give cylindrical injection molded articles and rectangular injection molded articles.

(1) Injection Molding Conditions for Cylindrical Injection Molded Articles

With a 70-ton vertical injection molding machine, the pellets were shaped into a cylindrical injection molded article 29 mm in diameter and 12.7 mm in length under conditions of a barrel temperature of 180° C. and an injection rate of 50 mm/s.

(2) Injection Molding Conditions for Rectangular Injection Molded Articles

With a 140-ton injection molding machine, the pellets were shaped into a 120 mm×150 mm×2 mm thick, rectangular injection molded article under conditions of a barrel temperature of 190° C. and an injection rate of 70 mm/s.

<Shore a Hardness>

The Shore A hardness (instantaneous value) was measured by testing the pressed sheet with a type-A meter in accordance with JIS K 6253, and reading the scale immediately after the probe touched the pressed sheet. The results are described in Table 1.

<Tensile Strength and Elongation>

A dumbbell-shaped No. 3 test piece was prepared from the pressed sheet. The test piece prepared was subjected to a tensile test at room temperature in accordance with JIS K 6251 (stress rate: 200 mm/min) to measure the modulus at 100% elongation (M100), the stress at break (TB) and the elongation at break (EB). The results are described in Table 1.

<Compression Set>

In accordance with JIS K 6262, the cylindrical injection molded article was compressed by 25% in the longitudinal direction for 22 hours at 70° C. and was taken out from the compression device. Thirty minutes later, the length of the molded article was measured and the compression set (CS) was calculated. The results are described in Table 1.

<Coefficients of Friction>

In accordance with JIS K 7125, the coefficient of static friction and the coefficient of dynamic friction were measured by sliding glass (a slider) on the rectangular injection molded article at a test speed of 100 mm/min at room temperature or a temperature of 80° C. while applying a load of 1 kg to the glass. The slidability at room temperature and the slidability at high temperature were evaluated in accordance with the evaluation criteria described below. The results are described in Table 1.

Criteria for Evaluation of Slidability at Room Temperature

1: The coefficient of static friction and the coefficient of dynamic friction at room temperature are both 0.5 or less.

5: At least one of the coefficient of static friction and the coefficient of dynamic friction at room temperature is above 0.5.

Criteria for Evaluation of Slidability at High Temperature

1: The coefficient of static friction and the coefficient of dynamic friction at 80° C. are both 0.8 or less.

5: At least one of the coefficient of static friction and the coefficient of dynamic friction at 80° C. is above 0.8.

<Bleed-Out/Stickiness Evaluation>

The rectangular injection molded article was allowed to stand at a temperature of 80° C. for 168 hours, and was visually and tactually evaluated to determine the presence or absence of bleed-out and stickiness in accordance with the evaluation criteria described below. The results are described in Table 1.

Criteria for Evaluation of Bleed-Out and Stickiness

1: The article has no bleed-out and is not sticky when touched.

2: The article has no bleed-out but is slightly sticky when touched.

3: The article has no bleed-out but is sticky when touched.

4: The article has slight bleed-out and is sticky when touched.

5: The article has bleed-out and is sticky when touched.

TABLE 1

| | | Ex. 1 | Ex. 2 | Comp. Ex. 1 | Comp. Ex. 2 |
|---|---|---|---|---|---|
| Raw materials | Copolymer (A-1) | 100 | 100 | 100 | 100 |
| | PP-1 | 60.6 | 41.7 | 79.3 | 38 |
| | PP-2 | | 28.2 | | 24.7 |
| | Silicone masterbatch (C-1) | 8.4 | 8.7 | | |
| | Amount of polyorganosiloxane in (C-1) | 3.4 | 3.5 | | |
| | Silicone masterbatch (C'-2) | | | 14 | 12 |
| | Amount of polyorganosiloxane in (C'-2) | | | 7 | 6 |
| | Silicone oil (C-3) (100 cSt) | | | | |
| | Higher fatty acid amide (D-1) | 0.42 | 0.65 | | 0.64 |
| | Softener (E-1) | 65.60 | 66.57 | 68.57 | 65.57 |
| | Crosslinking agent | 1.00 | 0.95 | 0.95 | 0.95 |
| | Crosslinking aid | 0.40 | 0.38 | 0.38 | 0.38 |
| | Carbon black | 5.20 | 5.40 | 5.80 | 5.40 |
| Evaluation results | Shore A hardness | 85 | 84 | 83 | 82 |
| | M100 (MPa) | 3.6 | 3.6 | 3.8 | 3.4 |
| | TB (MPa) | 7.7 | 7.2 | 8.8 | 7.1 |
| | EB (%) | 630 | 610 | 660 | 640 |
| | CS (%) | 51 | 55 | 57 | 49 |
| | Coefficient of static friction (room temperature) | 0.18 | 0.25 | 0.5 | 0.54 |
| | Coefficient of dynamic friction (room temperature) | 0.24 | 0.16 | 0.96 | 0.68 |
| | Coefficient of static friction (80° C.) | 0.54 | 0.41 | 1.7 | 0.57 |
| | Coefficient of dynamic friction (80° C.) | 0.57 | 0.58 | 1.69 | 0.89 |
| | Evaluation of slidability at room temperature | 1 | 1 | 5 | 5 |
| | Evaluation of slidability at high temperature (80° C.) | 1 | 1 | 5 | 5 |
| | Evaluation of bleed-out and stickiness | 2 | 2 | 2 | 2 |

TABLE 1-continued (Concluded)

| | | Comp. Ex. 3 | Comp. Ex. 4 | Comp. Ex. 5 | Comp. Ex. 6 |
|---|---|---|---|---|---|
| Raw materials | Copolymer (A-1) | 100 | 100 | 100 | 100 |
| | PP-1 | 60.6 | 60.6 | 60.6 | 60.6 |
| | PP-2 | | | | |
| | Silicone masterbatch (C-1) | | | 8.4 | |
| | Amount of polyorganosiloxane in (C-1) | | | 3.4 | |
| | Silicone masterbatch (C'-2) | | | | |
| | Amount of polyorganosiloxane in (C'-2) | | | | |
| | Silicone oil (C-3) (100 cSt) | | 3 | | |
| | Higher fatty acid amide (D-1) | 5 | | | 0.42 |
| | Softener (E-1) | 65.60 | 65.60 | 65.60 | 65.60 |
| | Crosslinking agent | 1.00 | 1.00 | 1.00 | 1.00 |
| | Crosslinking aid | 0.40 | 0.40 | 0.40 | 0.40 |
| | Carbon black | 5.20 | 5.20 | 5.20 | 5.20 |
| Evaluation results | Shore A hardness | 80 | 80 | 81 | 80 |
| | M100 (MPa) | 3.18 | 3.18 | 3.19 | 3.19 |
| | TB (MPa) | 7.26 | 6.93 | 7.45 | 7.08 |
| | EB (%) | 604 | 548 | 596 | 553 |
| | CS (%) | 50 | 52 | 47 | 46 |
| | Coefficient of static friction (room temperature) | 0.22 | 0.79 | 0.95 | 0.24 |
| | Coefficient of dynamic friction (room temperature) | 0.25 | 0.65 | 0.87 | 0.6 |
| | Coefficient of static friction (80° C.) | 0.87 | 0.88 | 0.92 | 1.36 |
| | Coefficient of dynamic friction (80° C.) | 0.92 | 0.73 | 0.88 | 1.81 |
| | Evaluation of slidability at room temperature | 1 | 5 | 5 | 5 |
| | Evaluation of slidability at high temperature (80° C.) | 5 | 5 | 5 | 5 |
| | Evaluation of bleed-out and stickiness | 5 | 4 | 2 | 2 |

The compositions obtained in Examples 1 and 2 exhibited small values of the coefficient of static friction and the coefficient of dynamic friction at room temperature and also at high temperature, and were rated as good (1) in the evaluation of slidability at room temperature and also at high temperature. That is, it can be said that a shaped article obtained from the present composition has low friction at room temperature and at high temperature, and offers excellent slidability.

No significant difference was found between Examples and Comparative Examples in terms of properties except the coefficients of friction, specifically, the shore A hardness, M100, TB, EB and CS. It can therefore be said that a shaped article obtained from the present composition attains excellent slidability as well as being comparable to the conventional shaped articles in terms of mechanical properties.

In contrast, Comparative Examples 1 to 6 resulted in poor evaluation results of slidability, particularly, slidability at high temperature. Comparative Examples 1, 2, and 4 to 6 also resulted in poor evaluation results of slidability at room temperature. Further, the evaluation of stickiness and bleed-out was poor in Comparative Examples 3 and 4.

The invention claimed is:

1. A thermoplastic elastomer composition comprising:

100 parts by mass of an ethylene/α-olefin/non-conjugated polyene copolymer (A) comprising constituent units derived from ethylene, a C3-C20 α-olefin and a non-conjugated polyene;

1 to 100 parts by mass of a crystalline polyolefin (B); 0.1 to 20 parts by mass of a polyorganosiloxane (C) having a viscosity at 25° C. (measured by a method in accordance with ASTM D 445-46T) of 100,000 cSt or less; and 0.42 to 0.65 parts by mass of a higher fatty acid amide (D), wherein a coefficient of static friction or a coefficient of dynamic friction of a shaped article including the thermoplastic elastomer composition measured at 80° C. in accordance with JIS K 7125 is 0.8 or less.

2. The thermoplastic elastomer composition according to claim 1, wherein the crystalline polyolefin (B) has a melt flow rate (measured at 230° C. under 2.16 kg load by a method in accordance with ASTM D 1238-65T) of 0.01 to 100 g/10 min, and has a melting point (measured by a method in accordance with JIS K 7121) of 100° C. or above.

3. The thermoplastic elastomer composition according to claim 1, further comprising a softener (E).

4. The thermoplastic elastomer composition according to claim 1, wherein the crystalline polyolefin (B) comprises a crystalline olefin copolymer (B1) and a crystalline olefin homopolymer (B2).

5. The thermoplastic elastomer composition according to claim 1, which is a thermoplastic elastomer composition obtained by dynamic heat treatment in the presence of a crosslinking agent.

6. A shaped article comprising the thermoplastic elastomer composition according to claim 1.

7. A vehicle part comprising the shaped article according to claim 6.

8. The vehicle part according to claim 7, which is a glass run channel member.

* * * * *